US012498996B2

(12) United States Patent
Wilkins et al.

(10) Patent No.: US 12,498,996 B2
(45) Date of Patent: Dec. 16, 2025

(54) HYBRID PAGINATION FOR RETRIEVING DATA

(71) Applicant: INTUIT INC., Mountain View, CA (US)

(72) Inventors: Mark Loren Wilkins, Boise, ID (US); Scott A. Jeide, Boise, ID (US); Jody Lee Terrill, Boise, ID (US)

(73) Assignee: INTUIT INC., Mountain View, CA (US)

( * ) Notice: Subject to any disclaimer, the term of this patent is extended or adjusted under 35 U.S.C. 154(b) by 347 days.

(21) Appl. No.: 18/194,214

(22) Filed: Mar. 31, 2023

(65) Prior Publication Data

US 2024/0330083 A1 Oct. 3, 2024

(51) Int. Cl.
 *G06F 9/54* (2006.01)
(52) U.S. Cl.
 CPC .............. *G06F 9/544* (2013.01); *G06F 9/547* (2013.01)
(58) Field of Classification Search
 CPC .................................. G06F 9/544; G06F 9/547
 See application file for complete search history.

(56) References Cited

U.S. PATENT DOCUMENTS

| 2014/0281351 | A1* | 9/2014 | Topp | G06F 12/1027 |
| | | | | 711/205 |
| 2015/0301952 | A1* | 10/2015 | McKinley | G06F 12/023 |
| | | | | 711/208 |
| 2017/0344481 | A1* | 11/2017 | Pack, III | G06F 12/0833 |
| 2021/0173888 | A1* | 6/2021 | Flack | G06F 16/9017 |
| 2021/0266220 | A1* | 8/2021 | A | G06F 16/27 |
| 2021/0389946 | A1* | 12/2021 | Wilkerson | G06F 12/1009 |

\* cited by examiner

*Primary Examiner* — Kevin L Young
*Assistant Examiner* — Carina Yun
(74) *Attorney, Agent, or Firm* — Patterson +Sheridan, LLP (57) ABSTRACT

The present disclosure provides techniques for hybrid pagination for retrieving data. One example method includes receiving, at a server, a first application programming interface (API) request indicating a first offset and a first limit, retrieving, by the server, a given page comprising a list of items based on the first offset and the first limit in response to the first API request, creating, by the server, an entry in a cache based on the first API request, wherein the entry comprises cursor information indicating a last item in the list of items in the given page, receiving, by the server, a second API request indicating a second offset and a second limit for a subsequent page of the given page, generating, by the server, a cache key based on the second API request, retrieving, by the server, the entry from the cache based on the generated cache key, and retrieving, by the server, based on the last item in the list of items in the given page indicated in the entry and the second limit, the subsequent page in response to the second API request.

19 Claims, 4 Drawing Sheets

HYBRID PAGINATION FOR RETRIEVING DATA

INTRODUCTION

Aspects of the present disclosure relate to hybrid pagination for retrieving data.

In many software applications, data (e.g., electronic records) may be retrieved in order to perform various tasks with respect to specific types of transactions. The retrieved electronic records are often organized into pages to be presented to and viewed by a user or to be consumed by an application. Currently, two popular pagination approaches are offset-based pagination and cursor-based pagination, respectively. The two pagination approaches are usually implemented in different scenarios.

Offset-based pagination is usually implemented when the data is static. It allows jumping to any page and is generally easy to implement. However, as the number of the records grows, offset-based pagination will become less efficient. In an example relational database with 1000 records, a request for the 801th record would require, in an offset-based approach, picking the first 801 records from the database and discarding the first 800 records, resulting in huge waste of memory and computational resources.

In contrast, cursor-based pagination is generally preferred when the data is dynamic (e.g., subject to insertion, deletion, and so on). It is more scalable than offset-based pagination. As the dataset grows, cursor-based pagination can continue to retrieve data efficiently. However, cursors are more complex to implement and limited in some functionalities. For example, cursor-based pagination cannot be used to retrieve a given page unless the address (e.g., specified by a row number or indicated via a pointer) of the start of the page is provided.

Furthermore, many environments (e.g., servers), including dynamic environments, still rely on offset-based pagination as they are built without cursor implementation. These environments are prone to errors and inaccuracies during data retrieval as offset-based pagination cannot handle frequent insertions and deletions. Similarly, newly implemented environments with cursor-based pagination lack some of the useful functions of offset-based pagination, as discussed above.

Accordingly, improved systems and methods are needed for pagination for retrieving data.

BRIEF SUMMARY

Certain embodiments provide a method for hybrid pagination for retrieving data. The method generally includes receiving, at a server, a first application programming interface (API) request indicating a first offset and a first limit, retrieving, by the server, a given page comprising a list of items based on the first offset and the first limit in response to the first API request, creating, by the server, an entry in a cache based on the first API request, wherein the entry comprises cursor information indicating a last item in the list of items in the given page, receiving, by the server, a second API request indicating a second offset and a second limit for a subsequent page of the given page, generating, by the server, a cache key based on the second API request, retrieving, by the server, the entry from the cache based on the generated cache key, and retrieving, by the server, based on the last item in the list of items in the given page indicated in the entry and the second limit, the subsequent page in response to the second API request.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of the various embodiments.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for hybrid pagination for retrieving data.

Many existing dynamic environments (e.g., servers) rely on offset-based pagination as they are built without cursor implementation. Frequent insertions and deletions in these environments could hamper the accuracy and consistency of the offset-based pagination during data retrieval. Similarly, newly implemented cursor-based environments lack some of the useful functions of offset-based pagination, such as jumping to any given page.

Embodiments of the present disclosure address these deficiencies in data retrieval in software applications by utilizing a hybrid of offset-based pagination and cursor-based pagination.

An environment built with a hybrid pagination system can receive user requests through APIs, such as Representational State Transfer (REST) APIs. The API requests can be standard limit offset requests. However, rather than merely performing offset-based pagination, embodiments of the present disclosure involve generating entries in a cache or database for request that are received, with each entry including information about the request (e.g., as a key) associated with information about the data that was retrieved in response to the request (e.g., as a value), such as including an indication of a last item that was included in the most recently retrieved page of results. The indication of the last item that was included in the most recently retrieved page of results may be referred to as cursor information. In one example, if a limit offset API request to retrieve page 1 was received, then an entry may be stored in the cache or database that has a key based on page 1 (and, in some embodiments, other information included in the request) and a value that indicates a last item that was included on page 1.

Subsequently, when a limit offset API request is received, a cache key can be generated using information indicated in the API request, and the cache key may be used to search the cache for relevant data that was retrieved by historical requests. The API request can indicate a page number as well as additional API information, such as a user of the API (e.g., a user ID), an endpoint of the API (e.g., an address of the API, such as a web address), filter parameters associated with the API (e.g., operators such as equals, greater than, less than, contains, and so on), or order information associated with the API (e.g., ascending order, descending order, etc.). To generate a cache key, the page number of a previous page (e.g., the page number indicated in the API request decremented by 1) is used. For example, if the API request includes a request for page 2 from the environment, the cache key generated for the API request would indicate page 1 instead (e.g., 2-1). In some embodiments, additionally, the additional API information is also be used to generate the cache key. In some embodiments, the cache key is a hash value computed using values of the page number of a previous page and the additional API information.

Accordingly, if the previous page has been requested and retrieved previously, the value corresponding to the cache key generated can include relevant information of the previous page (e.g., the last item in the previous page). The relevant information can be represented using cursor information and be used to help retrieve the requested page.

On the other hand, if the cache key for the API request has no corresponding value (e.g., a previous page has not been retrieved yet for similar scenarios), the page requested can be retrieved using the limit and the offset indicated in the API request. In addition, the environment can create a cache key value pair, where the cache key indicates the API request and the value includes cursor information related to the retrieved data, such as the last item in the requested page. The cache key value pair can be stored in the cache or database discussed above.

Conventional cursor-based pagination cannot accommodate a limit offset API request for a page, especially when the start of the page requested is unknown. Furthermore, when there is insertion or deletion of the data in the environment, relying solely on conventional offset-based pagination to process the limit offset API request for a page would result in inconsistent data retrieval (e.g., omission or duplication) and possibly parsing errors.

However, the hybrid pagination techniques described herein allow data to be retrieved correctly while ensuring low computational cost when dealing with limit offset API requests. Details regarding the contrast between the hybrid pagination and traditional offset-based pagination and cursor-based pagination can be found below with respect to FIG. 2.

By recording and storing a limit offset API request and its corresponding page retrieved along with cursor information (e.g., identifying the last item on the corresponding page), techniques described herein overcome deficiencies in existing techniques for computer-based pagination for data retrieval. The hybrid pagination combines the benefits of offset-based pagination and cursor-based pagination, namely the flexibility and ease of implementation of offset-based pagination and the reliability and scalability of cursor-based pagination. Furthermore, the hybrid pagination allows existing environments built with offset-based pagination without cursor support to enjoy cursor-like functionality, especially with respect to the pointer-like functionality for data retrieval, such that API providers and subscribers do not need newer versions of the APIs to enjoy comparable processing time.

Thus, embodiments of the present disclosure provide a technical improvement with respect to conventional techniques for pagination for retrieving data and improve the user experience of software applications by requiring shorter computational time while providing increased consistency and flexibility.

Example Hybrid Pagination System for Retrieving Data

Figure 1:
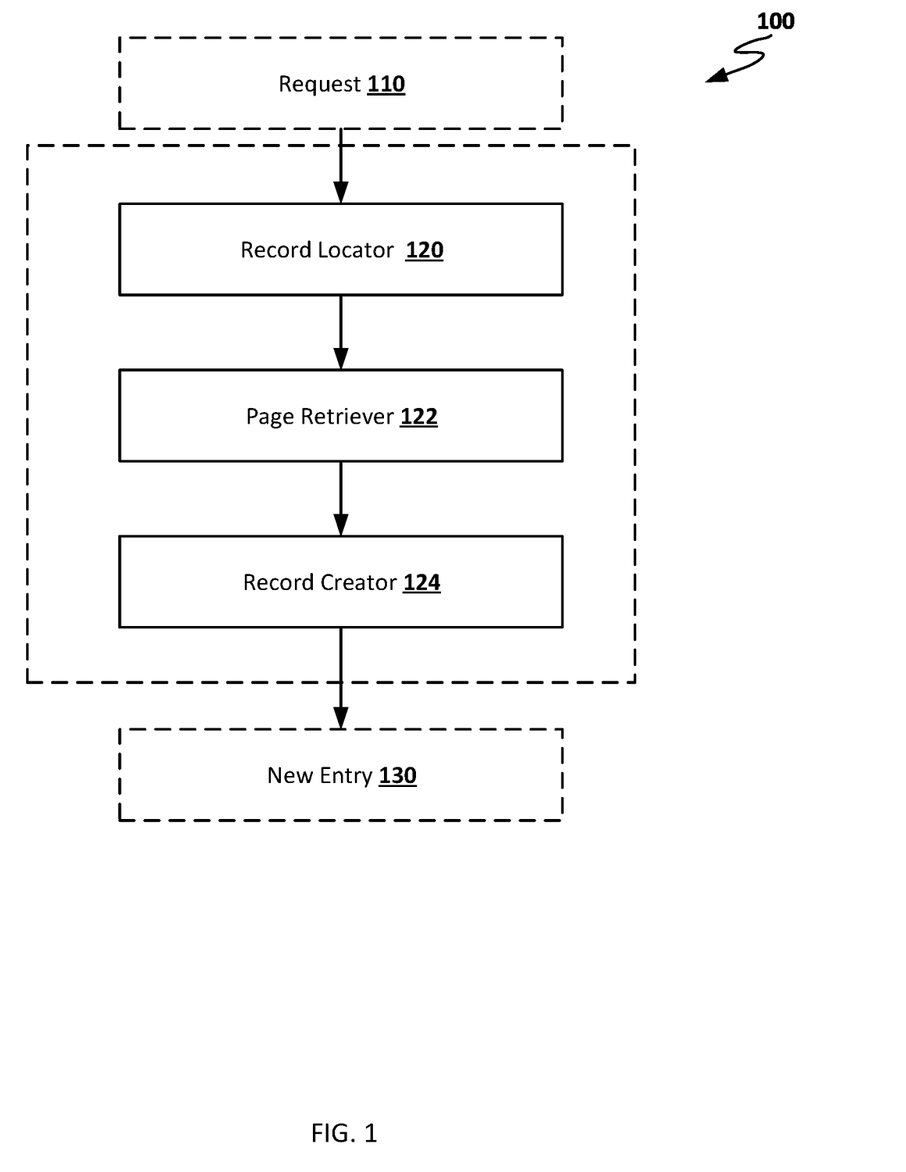
FIG. 1 depicts an example pagination system for hybrid pagination for retrieving data.

FIG. 1 depicts an example hybrid pagination system 100 for retrieving data. Hybrid pagination system 100 can receive request 110 as an input and generate new entry 130 as an output. Hybrid pagination system 100 can be implemented in an environment (e.g., a server) with dynamic data or with static data. For simplicity, the environment in the following discussion is assumed to be one with dynamic data.

Request 110 can indicate a limit offset request received from a user (e.g., through an API). Request 110 can indicate a page number (e.g., through the offset query parameter) and a list of items in the page (e.g., through the limit query parameter). In some examples, request 110 further indicates additional API information about the API request, such as a user of the API (e.g., a user ID), an endpoint of the API (e.g., an address of the API, such as a web address), filter parameters associated with the API (e.g., operators such as equals, greater than, less than, contains, and so on), or order information associated with the API (e.g., ascending order, descending order, etc.).

Request 110 can be provided as an input to record locator 120. Record locator 120 can first generate a key based on information indicated by request 110. For example, record locator 120 can utilize the page number of a previous page (e.g., the page number indicated in the API request decremented by 1) to generate the cache key. For example, if the API request comprises a request for page 2 from the environment, the cache key generated for the API request would indicate page 1 instead (e.g., because the key is being used to search for a cache or database entry corresponding to a previously requested page rather than the currently requested page). In some examples, the additional API information (e.g., the user of the API, the endpoint of the API, filter parameters associated with the API, or order information associated with the API) is also used to generate the cache key. A cache key generated using the additional API information can relate to a local environment specific to the user and the API endpoint. In some examples, the cache key is a hash value computed using values of the page number of a previous page and, in some embodiments, the additional API information.

Record locator 120 can then try to retrieve an entry (e.g., a key value pair) from a cache or database (not illustrated) using the cache key. In the following discussion, for simplicity, the cache or database is assumed to be a cache.

If such an entry corresponding to the cache key exists, the previous page to the requested page has been requested before and its related record exists in the cache, such that the entry would include cursor information about a last item in the list of items in the previous page. Once retrieved, the cursor information can be used to translate request 110 by record locator 120. For example, the offset query parameter in request 110 can be replaced with an address (e.g., specified by a row number or indicated via a pointer) of the last item in the previous page indicated in the cursor information. In other words, instead of specifying how many records to skip by the offset query parameter, the translated request indicates retrieving a set number of records (e.g., as specified by the limit query parameter) after a certain address (e.g., a row number specified for or a pointer indicated of the last item in the previous page).

The translated request is invariant to insertions or deletions as the translated request points to the last item in the previous page, rather than an offset that is prone to changes caused by insertions and deletions. The invariance ensures consistency and scalability in retrieving paginated data by minimizing potential omissions or duplications caused by changes in the environment. Details about the invariance to insertion or deletion provided by the translation to a request can be found below with respect to FIG. 2.

On the other hand, when a previous page of the requested page has not been retrieved yet or when the time to live (TTL) of the entry associated with the previous page expires in the cache, the cache key does not correspond to any entry in the cache. Accordingly, record locator 120 would not translate (e.g., modify) request 110. In some embodiments, the TTL is a configurable parameter of the cache or database that may be set in advance.

Page retriever 122 can handle either request 110 or the translated request to retrieve the page. For request 110, page retriever 122 can retrieve the requested page using the offset query parameter and the limit query parameter indicated in request 110. Similarly, for the translated request, page retriever 122 can retrieve the requested page using the address of the last item in the previous page indicated in the cursor information and the limit query parameter. Details regarding page retrieval using limit offset requests and translated requests in a dynamic environment can be found below with respect to FIG. 2.

After the requested page is retrieved by page retriever 122, record creator 124 can create new entry 130 to be stored in the cache. Record creator 124 can first generate a new cache key indicating the page number of the page according to request 110. In some examples, the new cache key indicates additional information of request 110. In other words, the new cache key is similar to the cache key generated by record locator 120 but indicates the page number of the requested page rather than the page number of the previous page. Similarly, record creator 124 can identify the last item of the requested page and create a new cursor indicating the last item of the requested page. The new cache key and the new cursor can be combined to form new entry 130. Similar to the entry discussed above, new entry 130 can be used to help retrieve a subsequent page to the requested page.

Example Environment for Hybrid Pagination for Retrieving Data

Figure 2:
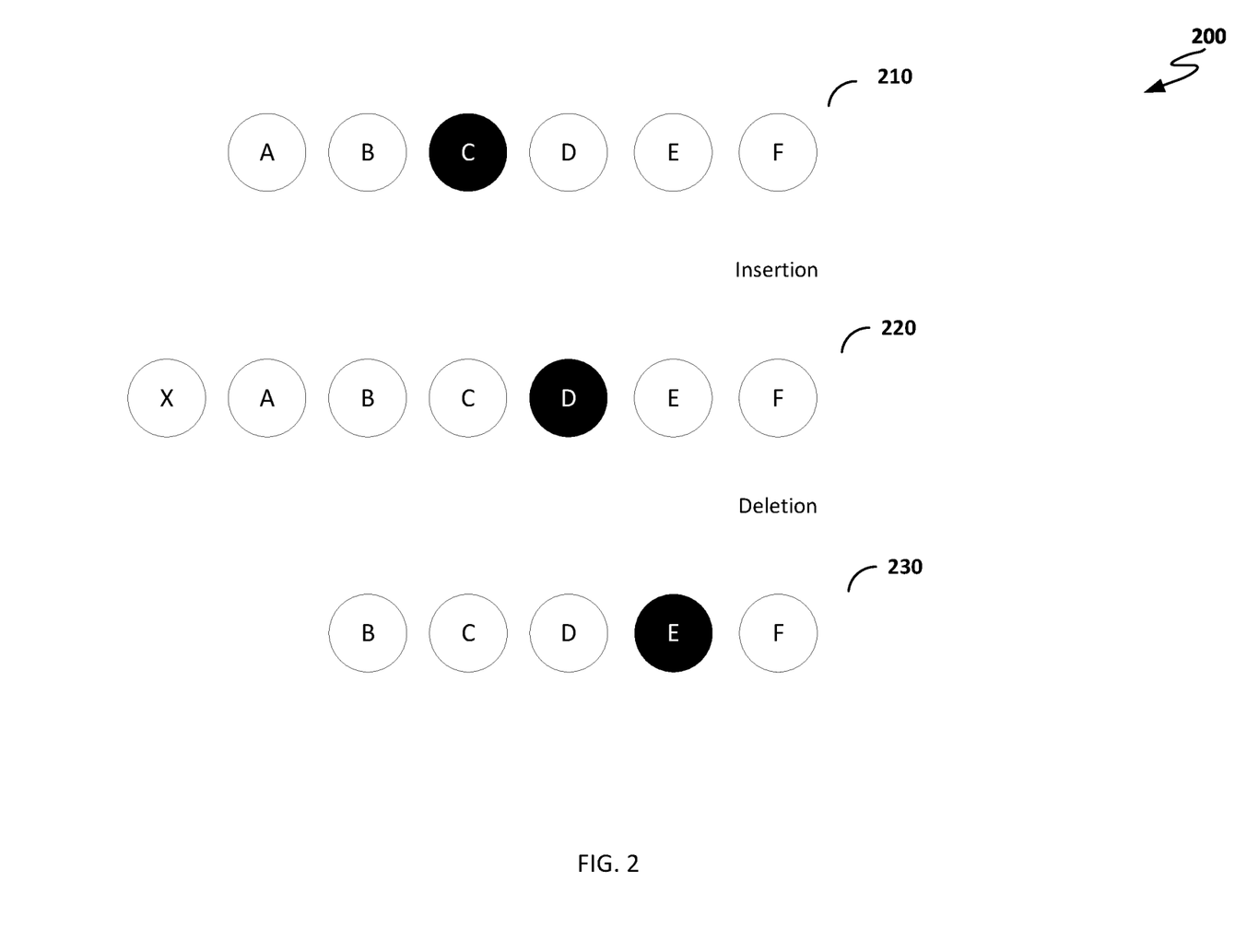
FIG. 2 depicts an example environment for hybrid pagination for retrieving data.

FIG. 2 depicts an example environment 200 for hybrid pagination for retrieving data. Although environment 200 is depicted as a dynamic server environment (e.g., a database server), environment 200 can accommodate dynamic data or static data. Although FIG. 2 depicts a set of pages in environment 200, fewer or more pages can be included in environment 200. For simplicity, each page is assumed to have a fixed list of 1 item, though fewer or more items can be included in each page. In addition, though environment 200 can include a cache, a database, or both, the following discussion assumes, for simplicity, that entries indicating cache keys and cursor information are stored in a cache (not illustrated).

Environment 200 can start with page set 210 of 6 pages, namely pages A-E. Each page A-E includes a corresponding item, namely items 1-6, respectively. Environment 200 can receive a first API request from a user, similar to request 110 illustrated in FIG. 1. In this example, the first API request aims to retrieve page C from page set 210 with an offset of 2 and limit of 1.

Environment 200 can first generate a cache key indicating a page number of a previous page to page C (e.g., 2 as the page number of page B, which is the page number of page C, e.g., 3, decremented by 1), and then use the cache key to retrieve an entry from a cache, as discussed with respect to record locator 120 illustrated in FIG. 1. However, in this example, such an entry does not exist yet, so that environment 200 proceeds to retrieve page C using the offset and limit parameters, as discussed with respect to page retriever 122 illustrated in FIG. 1.

After page C is retrieved, environment 200 further creates an entry with a page number associated with page C (e.g., 3) in a cache key and the last item in page C (e.g., item 3) in a cursor, similar to new entry 130 illustrated in FIG. 1. The entry can be stored in the cache.

In contrast, a cursor-based request may not be able to request page C directly from environment 200. To successfully request page C, the cursor-based request would need to indicate the start of page C (e.g., item 3). However, the item information may not be available when constructing the cursor-based request, and the cursor-based request may not request page C directly. Instead, hybrid pagination allows jumping to a specific page, which cursor-based pagination does not accommodate. Furthermore, many existing systems do not natively support cursor-based pagination.

After the insertion of page X (e.g., including item 0) at the start, environment now has page set 220 of 7 pages. Environment 200 can receive a second API request from the user, similar to request 110 illustrated in FIG. 1. In this example, the user is unaware of the insertion and the second API request aims to retrieve page D from page set 220 with an offset of 3 and limit of 1.

Instead of processing the second API request directly, environment can first generate a cache key indicating a page number of a previous page to page D (e.g., 3 as the page number of page C, which is the page number of page D, e.g., 4, decremented by 1), and then use the cache key to retrieve an entry from a cache, as discussed with respect to record locator 120 illustrated in FIG. 1. In this example, such an entry has been created as discussed above, so that environment 200 proceeds to retrieve cursor information in the entry. The cursor information indicates the last item in the previous page of the requested page (e.g., item 3 in page C).

Accordingly, the second API request is translated to indicate the last item (e.g., with an address) in the previous page rather than the offset, as discussed with respect to FIG. 1. Environment 200 can proceed to retrieve page D using the last item of the previous page and the limit query parameter, as discussed with respect to page retriever 122 illustrated in FIG. 1. In this example, the next item (e.g., item 4) following the last item of the previous page (e.g., item 3 in page C) is the start of page D, and a total of 1 item is specified in the limit of 1, such that item 4 is retrieved to form page D.

After page D is retrieved, environment 200 further creates an entry with a page number associated with page D (e.g., 4) in a cache key and the last item in page D (e.g., item 4) in a cursor, similar to new entry 130 illustrated in FIG. 1. The entry can be stored in the cache.

In contrast, if the second API request is processed directly using offset-based pagination without the translation discussed above, the second API request would retrieve page C instead (e.g., due to the insertion of page X), resulting in duplication and confusion for the user.

After the deletions of page X (e.g., including item 0) and page A (e.g., including item 1) at the start, environment now has page set 230 of 5 pages. Environment 200 can receive a third API request from the user, similar to request 110 illustrated in FIG. 1. In this example, the user is unaware of the deletions and the third API request aims to retrieve page E from page set 230 with an offset of 4 and limit of 1.

Instead of processing the second API request directly, environment can first generate a cache key indicating a page number of a previous page of page E (e.g., 4 as the page number of page D, which is the page number of page E, e.g., 5, decremented by 1), and then use the cache key to retrieve an entry from a cache, as discussed with respect to record locator 120 illustrated in FIG. 1. In this example, such an entry has been created as discussed above, so that environment 200 proceeds to retrieve cursor information in the entry. The cursor information indicates the last item in the previous page of the requested page (e.g., item 4 in page D).

Accordingly, the third API request is translated to indicate the last item (e.g., with an address) in the previous page rather than the offset, as discussed with respect to FIG. 1. Environment 200 can proceed to retrieve page E using the last item of the previous page and the limit query parameter, as discussed with respect to page retriever 122 illustrated in FIG. 1. In this example, the next item (e.g., item 5) following the last item of the previous page (e.g., item 4 in page D) is the start of page E, and a total of 1 item is specified in the limit of 1, such that item 5 is retrieved to form page E.

After page E is retrieved, environment 200 further creates an entry with a page number associated with page E (e.g., 5) in a cache key and the last item in page E (e.g., item 5) in a cursor, similar to new entry 130 illustrated in FIG. 1. The entry can be stored in the cache.

In contrast, if the third API request is processed directly using offset-based pagination without the translation discussed above, the third API request would retrieve page F instead (e.g., due to the deletions of pages X and A), resulting in omission and confusion for the user.

It is noted that while certain examples are explained herein with respect to the insertions or deletions of pages, individual items may be inserted or deleted, thus changing the compositions of the pages.

Example Operations for Hybrid Pagination for Retrieving Data

Figure 3:
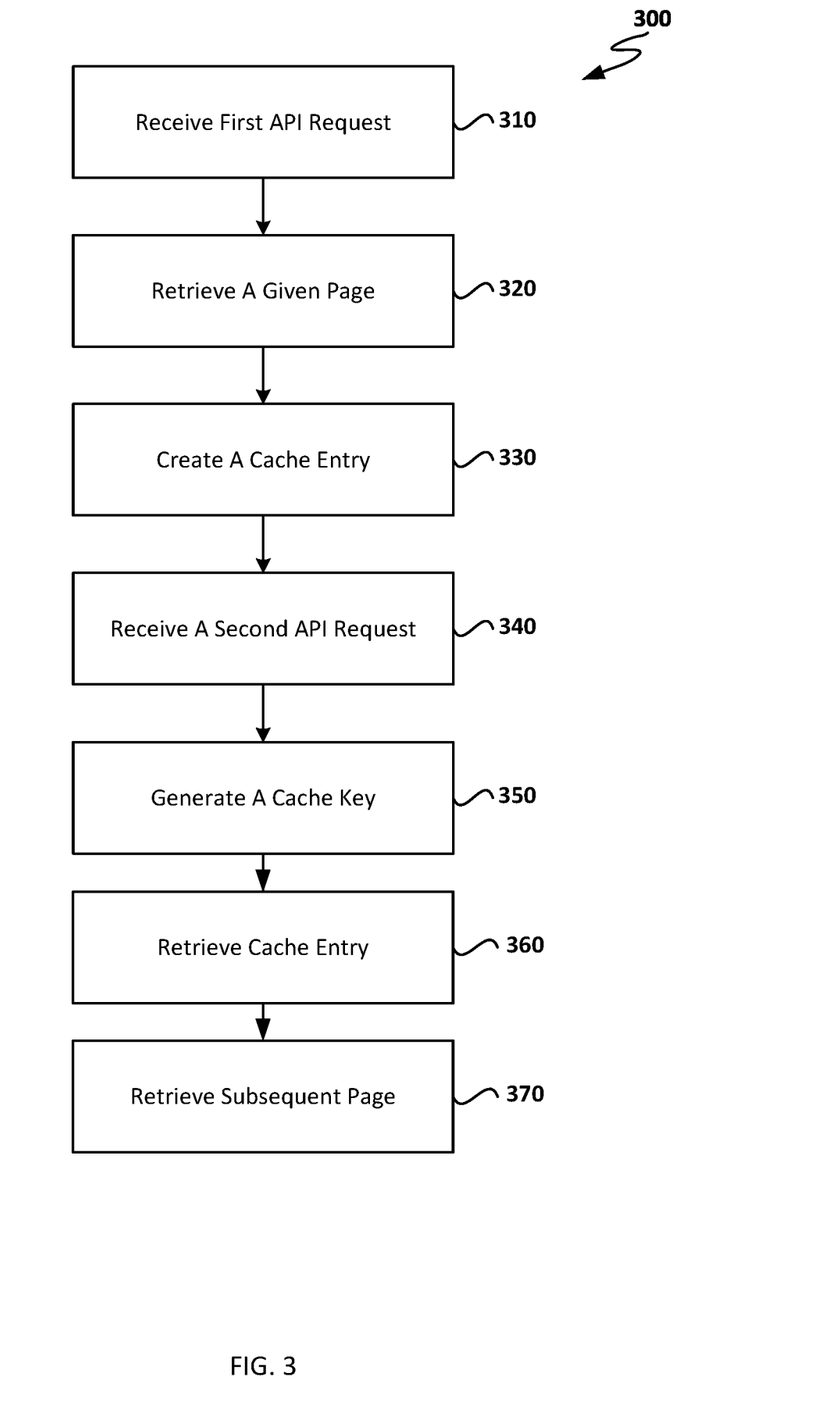
FIG. 3 is a flow diagram of example operations for hybrid pagination for retrieving data.

FIG. 3 is a flow diagram of example operations 300 for hybrid pagination for retrieving data. Operations 300 may be performed by a categorization system, such as categorization system 100 as illustrated in FIG. 1.

Operations 300 begin at 310, where a first application programming interface (API) request indicating a first offset and a first limit is received at a server. For example, the first API request can be request 110 illustrated in FIG. 1 or the first API request discussed with respect to FIG. 2, whereas the server can be the environment discussed with respect to FIG. 1 or environment 200 illustrated in FIG. 2.

At 320, a given page comprising a list of items based on the first offset and the first limit in response to the first API request is retrieved by the server. For example, the given page can be page C illustrated in FIG. 2, whereas the retrieval can be performed using page retriever 122 illustrated in FIG. 1.

In some embodiment, that a respective cache key generated based on the first API request does not correspond to any entry in the cache is further determined. For example, the cache key may not correspond to an entry in the cache when a previous page of the given page has not been requested yet or the time to live (TTL) for the cache entry indicating the previous page of the given page has expired, as discussed with respect to FIG. 1.

At 330, an entry in a cache can be created by the server based on the first API request, wherein the entry comprises cursor information indicating a last item in the list of items in the given page. For example, the entry can be new entry 130 illustrated in FIG. 1 or the entries discussed with respect to FIG. 2, which can be created using record creator 124 illustrated in FIG. 1.

In some embodiments, a key of the entry indicates a page number of the given page, and wherein a value of the entry comprises the cursor information indicating the last item in the list of items in the given page, similar to the entries discussed with respect to FIG. 2, which can be created using record creator 124 illustrated in FIG. 1.

In some embodiments, additionally, the key further indicates one or more of a user of the API, an endpoint of the API, filter parameters associated with the API, or order information associated with the API, as discussed with respect to FIG. 1.

In some embodiments, additionally, the key of the entry is a hash value. For example, the key can be generated by hashing the values representing the page number of the given page, the user of the API, the endpoint of the API, filter parameters associated with the API, or order information associated with the API, as discussed with respect to FIG. 1

At 340, a second API request indicating a second offset and a second limit is received by the server for a subsequent page of the given page. For example, the second API request can be the second API request or the third API request discussed with respect to FIG. 2, whereas the subsequent page of the given page can be page D or page E, respectively, as discussed with respect to FIG. 2.

At 350, a cache key is generated by the server based on the second API request. For example, the cache key can be the cache key generated by record locator 120 discussed with respect to FIG. 1, or one of the cache keys indicating a page number of a previous page of the requested page, as discussed with respect to FIG. 2.

In some embodiments, generating, by the server, the cache key based on the second offset and the second limit comprises determining a corresponding page number of the subsequent page based on the second offset and the second limit, and generating the cache key based on the corresponding page number decremented by one. For example, the cache key can be one of the cache keys indicating a page number of a previous page of the requested page, where the page number of a previous page corresponds to the page number of the requested page decremented by one, as discussed with respect to FIGS. 1-2.

At 360, the entry from the cache is retrieved by the server, based on the generated cache key. For example, the entry can be one of the entries indicating a last item in the previous page of the requested page, as discussed with respect to FIG. 2.

At 370, based on the last item in the list of items in the given page indicated in the entry and the second limit, the subsequent page is retrieved by the server in response to the second API request. For example, the subsequent page can be page D and page E discussed with respect to FIG. 2, whereas the retrieval can be performed using page retriever 122 illustrated in FIG. 1.

In some embodiments, retrieving, by the server, based on the entry, the subsequent page in response to the second API request comprises determining a next item as the first item of the subsequent page based on the last item in the list of items in the given page. For example, the next item can be item 4 or item 5, as discussed with respect to FIG. 2.

Example Application Server

Figure 4:
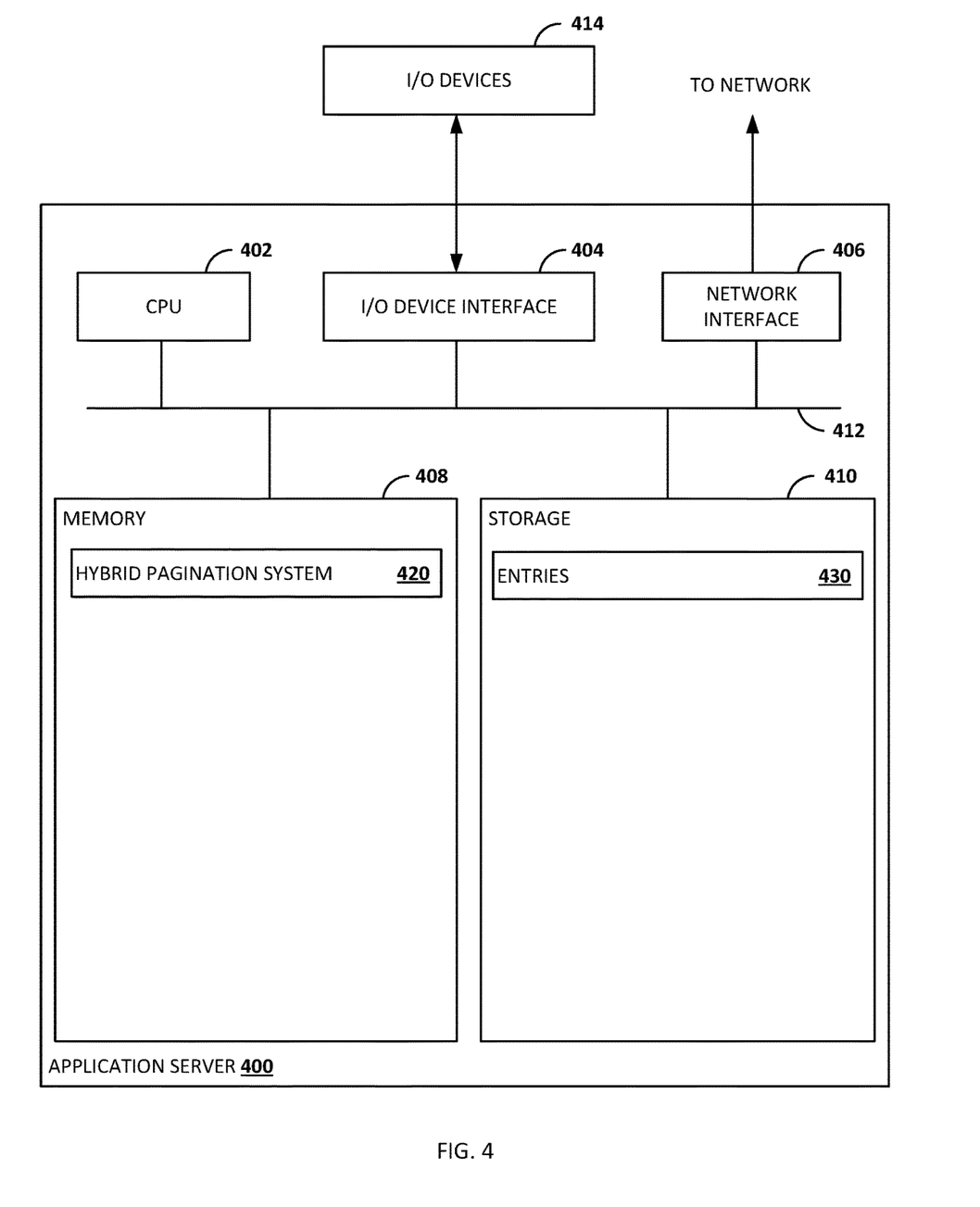
FIG. 4 depicts an example application server related to embodiments of the present disclosure.

FIG. 4 depicts an example application server 400, which can be used to deploy hybrid pagination system 100 of FIG. 1. As shown, application server 400 includes a central processing unit (CPU) 402, one or more input/output (I/O) device interfaces 404, which may allow for the connection of various I/O devices 414 (e.g., keyboards, displays, mouse devices, pen input, etc.) to application server 400, a network interface 406, a memory 408, a storage 410, and an interconnect 412.

CPU 402 may retrieve and execute programming instructions stored in memory 408. Similarly, CPU 402 may retrieve and store application data residing in memory 408. Interconnect 412 transmits programming instructions and application data, among CPU 402, I/O device interface 404, network interface 406, memory 408, and storage 410. CPU 402 is included to be representative of a single CPU, multiple CPUs, a single CPU having multiple processing cores, and the like. I/O device interface 404 may provide an interface for capturing data from one or more input devices integrated into or connected to application server 400, such as keyboards, mice, touchscreens, and so on. Memory 408 may represent a random access memory (RAM), while storage 410 may be a solid state drive, for example. Although shown as a single unit, storage 410 may be a combination of fixed and/or removable storage devices, such as fixed drives, removable memory cards, network attached storage (NAS), or cloud-based storage.

As shown, memory 408 includes hybrid pagination system 420. Hybrid pagination system 420 may be the same as or substantially similar to hybrid pagination system 100 of FIG. 1.

As shown, storage 410 includes entries 430. Entries 430 may be the same as or substantially similar to entries discussed with respect to FIGS. 1-2. In some embodiments, alternatively or additionally, entries 430 may be stored in a cache, as discussed with respect to FIGS. 1-2.

It is noted that the components depicted in application server 400 are included as examples, and other types of computing components may be used to implement techniques described herein. For example, while memory 408 and storage 410 are depicted separately, components depicted within memory 408 and storage 410 may be stored in the same storage device or different storage devices associated with one or more computing devices.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method, comprising:
   receiving, at a server, a first application programming interface (API) request for a first page included in a set of pages, the first API request indicating a first offset and a first limit;
   determining, at the server, a cache does not include an entry for a second page included in the set of pages and immediately preceding the first page;
   in response to determining the cache does not include the entry for the second page, implementing a first pagination approach by:
      retrieving, by the server, the first page based on the first offset and the first limit, the first page comprising a list of items; and
      creating, by the server, a first entry for the first page in the cache, wherein the first entry for the first page comprises cursor information indicating a last item in the list of items in the first page;
   receiving, by the server, a second API request indicating a second offset and a second limit for a third page included in the set of pages and immediately following the first page;
   in response to receiving the second API request, implementing a second pagination approach that is different from the first pagination approach by:
      generating, by the server, a cache key based on the second API request;
      retrieving, by the server, the first entry for the first page from the cache based on the generated cache key;
      retrieving, by the server, the third page in response to the second API request and based on the last item in the list of items in the first page as indicated in the entry for the first page; and
      in response to retrieving the third page, creating, by the server, a second entry for the third page in the cache, wherein the second entry for the third page comprises cursor information indicating a last item in a list of items in the third page.

2. The method of claim 1, wherein a key of the first entry for the first page indicates a page number of the first page, and wherein a value of the first entry for the first page comprises the cursor information indicating the last item in the list of items in the first page.

3. The method of claim 2, wherein the key of the first entry for the first page further indicates one or more of a user of the API, an endpoint of the API, filter parameters associated with the API, or order information associated with the API.

4. The method of claim 2, wherein the key of the first entry for the first page is a hash value.

5. The method of claim 2, wherein retrieving, by the server, the third page in response to the second API request and based on the first entry for the first page comprises determining a next item as a first item of the third page based on the last item in the list of items in the first page.

6. The method of claim 1, wherein generating, by the server, the cache key based on the second offset and the second limit comprises:
   determining a corresponding page number of the third page based on the second offset and the second limit; and
   generating the cache key based on the corresponding page number decremented by one.

7. The method of claim 1, wherein:
   the first pagination approach is offset-based pagination; and
   the second pagination approach is cursor-based pagination.

8. A system, comprising:
   a memory including computer-executable instructions; and
   a processor configured to execute the computer-executable instructions and cause the system to:
      receive, at a server, a first application programming interface (API) request for a first page included in a set of pages, the first API request indicating a first offset and a first limit;
      determine a cache does not include an entry for a second page included in the set of pages and immediately preceding the first page;
      in response to determining the cache does not include the entry for the second page, the processor implements a first pagination approach by causing the system to:
         retrieve, by the server, the first page based on the first offset and the first limit, the first page comprising a list of items; and
         create, by the server, a first entry for the first page in the cache, wherein the first entry for the first page comprises cursor information indicating a last item in the list of items in the first page;
      receive, by the server, a second API request indicating a second offset and a second limit for a third page included in the set of pages and immediately following the first page;
      in response to receiving the second API request, the processor implements a second pagination approach that is different from the first pagination approach by causing the system to:
         generate, by the server, a cache key based on the second API request;
         retrieve, by the server, the first entry for the first page from the cache based on the generated cache key;
         retrieve, by the server, the third page in response to the second API request and based on the last item in the list of items in the first page as indicated in the first entry for the first page; and
         in response to retrieving the third page, create a second entry for the third page in the cache, wherein the second entry for the third page comprises cursor information indicating a last item in a list of items in the third page.

9. The system of claim 8, wherein a key of the first entry for the first page indicates a page number of the first page, and wherein a value of the first entry for the first page comprises the cursor information indicating the last item in the list of items in the first page.

10. The system of claim 9, wherein the key of the first entry for the first page further indicates one or more of a user of the API, an endpoint of the API, filter parameters associated with the API, or order information associated with the API.

11. The system of claim 9, wherein the key of the first entry for the first page is a hash value.

12. The system of claim 9, wherein retrieving, by the server, the third page in response to the second API request and based on the first entry for the first page comprises determining a next item as a first item of the third page based on the last item in the list of items in the first page.

13. The system of claim 8, wherein generating, by the server, the cache key based on the second offset and the second limit comprises:
   determining a corresponding page number of the third page based on the second offset and the second limit; and
   generating the cache key based on the corresponding page number decremented by one.

14. A non-transitory computer readable medium comprising instructions to be executed in a computer system, wherein the instructions when executed in the computer system cause the computer system to:
   receive a first application programming interface (API) request for a first page included in a set of pages, the first API request indicating a first offset and a first limit;
   determine a cache does not include an entry for a second page included in the set of pages and immediately preceding the first page;
   in response to determining the cache does not include the entry for the second page, instructions cause the computer system to:
      retrieve the first page based on the first offset and the first limit, the first page comprising a list of items; and
      create a first entry for the first page in the cache, wherein the first entry for the first page comprises cursor information indicating a last item in the list of items in the first page;
   receive a second API request indicating a second offset and a second limit for third page included in the set of pages and immediately following the first page;
   in response to receiving the second API request, the instructions cause the computer system to:
   generate a cache key based on the second API request;
   retrieve the first entry for the first page from the cache based on the generated cache key;
   retrieve the third page in response to the second API request and based on the last item in the list of items in the first page as indicated in the entry for the first page; and
   in response to retrieving the third page, create a second entry for the third page in the cache, wherein the second entry for the third page comprises cursor information indicating a last item in a list of items in the third page.

15. The non-transitory computer readable medium of claim 14, wherein a key of the first entry for the first page indicates a page number of the first page, and wherein a value of the first entry for the first page comprises the cursor information indicating the last item in the list of items in the first page.

16. The non-transitory computer readable medium of claim 15, wherein the key for the first page further indicates one or more of a user of the API, an endpoint of the API, filter parameters associated with the API, or order information associated with the API.

17. The non-transitory computer readable medium of claim 15, wherein the key of the first entry for the first page is a hash value.

18. The non-transitory computer readable medium of claim 15, wherein retrieving based on the entry, the third page in response to the second API request comprises determining a next item as the first item of the third page based on the last item in the list of items in the first page.

19. The non-transitory computer readable medium of claim 14, wherein generating the cache key based on the second offset and the second limit comprises:
   determining a corresponding page number of the third page based on the second offset and the second limit; and
   generating the cache key based on the corresponding page number decremented by one.

* * * * *